United States Patent [19]

Lloyd

[11] Patent Number: 4,912,631

[45] Date of Patent: Mar. 27, 1990

[54] BURST MODE CACHE WITH WRAP-AROUND FILL

[75] Inventor: Stacey G. Lloyd, Aloha, Oreg.

[73] Assignee: Intel Corporation, Santa Clara, Calif.

[21] Appl. No.: 133,529

[22] Filed: Dec. 16, 1987

[51] Int. Cl.⁴ .............................................. G06F 13/28
[52] U.S. Cl. .................................. 364/200; 364/243.4; 364/260.2
[58] Field of Search ... 364/200 MS File, 900 MS File

[56] References Cited

U.S. PATENT DOCUMENTS

| | | | |
|---|---|---|---|
| 3,705,388 | 12/1972 | Nishimoto | 364/200 |
| 4,317,168 | 2/1982 | Messina et al. | 364/200 |
| 4,586,133 | 4/1986 | Steckler | 364/200 |
| 4,779,193 | 10/1988 | Koga et al. | 364/200 |
| 4,796,222 | 1/1989 | Aichelmann et al. | 364/900 |
| 4,797,813 | 1/1989 | Igarashi | 364/200 |

Primary Examiner—Lawrence E. Anderson
Attorney, Agent, or Firm—Owen L. Lamb

[57] ABSTRACT

A method of up-dating a cache (10) backed by a main memory (12). The cache is used as an intermediate high-speed memory between the main memory and a data processing unit (14). A burst mode request is for multiple words (k through n) included in an m-word line of data words (1 through m). The transfer takes place by first determining if the requested data words (k through n) reside in the cache. If they do, then the requested words (k through n) are transferred from the cache to the data processing unit. If they do not, then the requested words (k through n) are transferred simultaneously from the main memory both to the cache and to the data processing unit to thereby update the cache. This cache update is accomplished by first writing the last words of the line containing the requested words only to the cache (starting at word n+1 and ending at word k−1) and then writing the remaining words comprising the requested words (k through n) to the cache and the data processing unit simultaneously (starting at word k and ending at word n).

2 Claims, 1 Drawing Sheet

BURST MODE CACHE WITH WRAP-AROUND FILL

CROSS-REFERENCE TO RELATED APPLICATION

Copending patent application Ser. No. 890,859, of David Johnson, et al, entitled "Cache Directory and Control" filed on July 29, 1986, and assigned to Intel Corporation.

BACKGROUND OF THE INVENTION

1. Technical Field

The present invention relates to data processing systems and more particularly, to a method and apparatus for controlling data transfers between a data processing unit and a cache.

2. Background Art

A cache is a relatively high-speed, small, local memory which is used to provide a local storage for frequently accessed memory locations of a larger, relatively slow, main memory. By storing a duplicate copy of the most frequently used main memory information locally, the cache is able to rapidly respond to most memory references, thus avoiding the accessing of the slower main memory. The result is lower traffic on the memory bus and decreased latency on the local bus to the requesting data processing unit. In a multiprocessing system, the use of a cache also increases potential systems' performance by reducing each data processing unit's demand for system bus bandwidth, thus allowing more data processing units in the system.

The above-identified copending patent application Ser. No. 890,859, of David Johnson, et al. discloses a cache directory which is capable of being configured into a plurality of ways, each way including tag and valid-bit storage for associatively searching the directory for cache data-array addresses. A cache configuration register splits the cache directory into two or more logical directories which are able to control requests from two or more data processing units.

In the above-identified Johnson, et al. system, if an access results in a cache-read miss, the cache line (four words) is first updated with the data from main memory, and then the data is transferred from the cache to the data processing unit. This automatically results in four additional wait states for the data processing unit access in addition to any memory-latency wait states. The result is reduced performance and decreased bus bandwidth.

If the data processing unit's copy of the data is updated first and then the cache's copy of the data is updated, the cache will have to arbitrate for the bus in order to prevent the data processing unit from beginning another access while the cache is being updated. This would improve access latency, but would still decrease bus bandwidth.

If the system simultaneously tries to transfer data to the data processing unit and cache, the data processing unit may attempt another access before the cache is completely updated. For example, consider the situation where the data processing unit requests only the first word of the four-word line. The update of the cache line requires all four words, so while the last three words are being transferred to the cache only, the data processing unit may try to access the memory.

It is an object of the present invention to provide circuitry to improve the performance of a data processing unit which uses burst mode (multiple word) accesses to memory during a cache miss.

SUMMARY OF THE INVENTION

Briefly, the above object is accomplished in accordance with the invention by a method and apparatus of updating a cache backed by a main memory. Multiple word data transfers take place between the cache and the data processing unit if data is in the cache, and between the main memory and the data processing unit if data is not in the cache. Consider a burst mode request for multiple words (k . . . n) included in an m-word line of data words (1 . . . m), where k is the address of the first word requested and n is the address of the last word requested. The transfer takes place by first determining if the requested data words (k through n) reside in the cache. If they do reside in the cache, then the requested words (k through n) are transferred from the cache to the data processing unit. If they do not reside in the cache, then the cache is updated by transferring the requested words (k through n) simultaneously from the main memory to the cache and from the main memory to the data processing unit. This cache update is accomplished by first writing the last words of the line containing the requested words only to the cache (starting at word n+1 and ending at word k−1) and then writing the remaining words comprising the requested words (k thrugh n) to the cache and the data processing unit simultaneously (starting at word k and ending at word n).

BRIEF DESCRIPTION OF THE DRAWINGS

The invention will be apparent from the following, more particular description of a preferred embodiment of the invention as illustrated in the accompanying drawings, wherein.

DESCRIPTION OF THE PREFERRED EMBODIMENT

Figure 1:
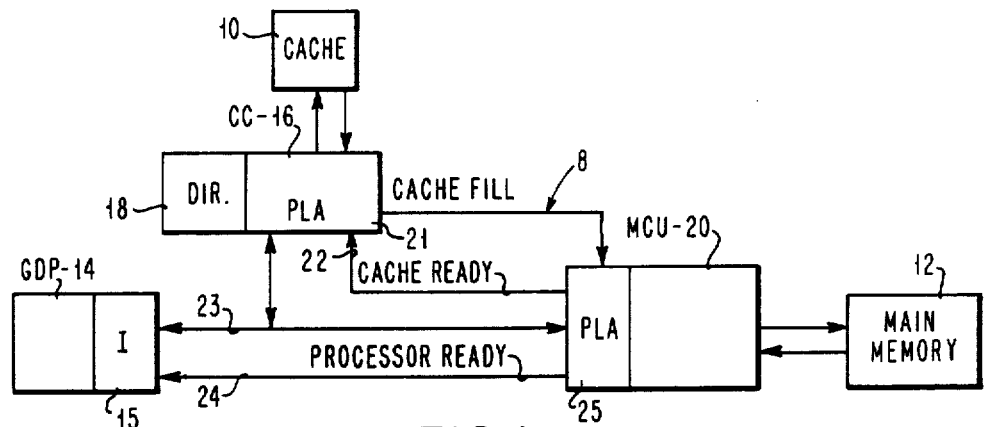
FIG. 1 is a block diagram of a data processing system in which the present invention is embodied.

Refer to FIG. 1 which is a block diagram of a data processing system in which the present invention is embodied. The system is comprised of a cache (10) which is a high-speed local store which duplicates most recently used information stored in slower main memory (12). The cache is used as an intermediate high-speed memory between the main memory and a generralized data processing unit (GDP-14). A cache controller (CC-16) is provided to control access to the cache (10) and a memory control unit (MCU-20) is provided to control access to the main memory (12). Communication between the GDP, cache controller (14) and MCU (20) is over an address/data bus (23) interconnecting the units. When the GDP requests information from memory via memory access interface (I-15), a search is made of a cache directory (18) in the cache controller to see if the information is in the cache. If it is, a main memory reference is avoided, since the data requested can be transferred from the cache. If the data is not in the cache, a main memory access is initiated and the data is transferred to the cache controller (16) and the GDP interface (15) over the bus (23). Both the cache controller (16) and the MCU (20) contain a programmable logic array (PLA). Each PLA (21 and 25) controls the data transfer in accordance with an identical programmed access algorithm.

The access algorithm provides that during a cache update, the order of access of requested words is altered, so that the non-requested words are transferred to the cache first, and then the requested words are transferred simultaneously to the cache and GDP. The GDP will not attempt a new data transfer via its memory access interface (15) until it receives the requested words. Since the order of transfer is changed, the GDP (14) receives the requested words after the cache (10) is updated with the non-requested words. This prevents a GDP access during the update of the cache.

Figure 2:
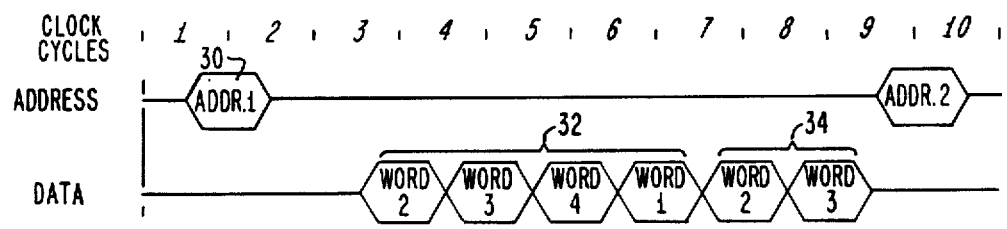
FIG. 2 is a timing diagram illustrating the order of access of words transferred by the prior art apparatus; and, FIG. 3 is a timing diagram illustrating the order of access of words transferred by the apparatus of FIG. 1.

To more clearly understand this, refer to FIG. 2 which is timing diagram of the prior art access method described in the above-identified Johnson, et al. application. In the above-identified Johnson, et al. application, if an access request, address 1 (30) on the address bus, results in a cache-read miss, the cache line (four words) is first updated with the new data (32) from memory, word 2, word 3, word 4, word 1 on the data bus, and then the requested data (34), word 2, word 3, on the data bus, is transferred from the cache to the GDP. This automatically results in four additional wait states (32) for the GDP access in addition to any memory-latency-wait states.

Figure 3:
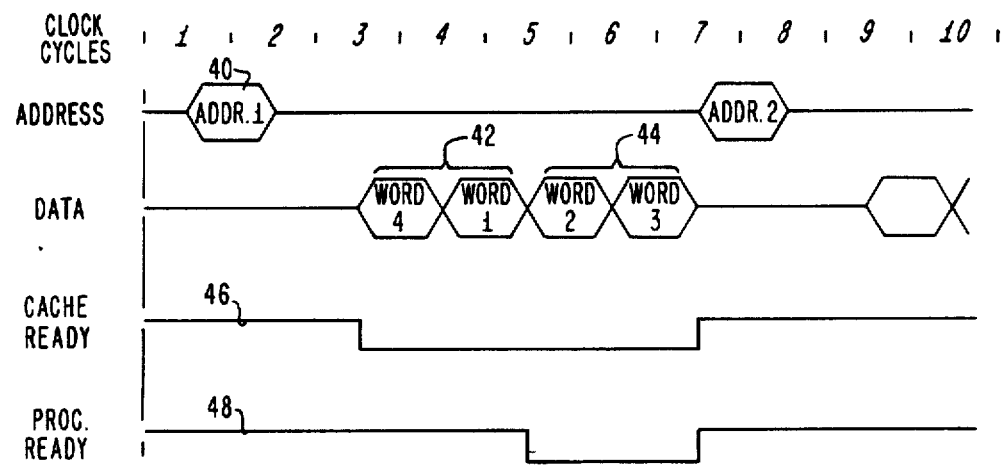

FIG. 3 is a timing diagram illustrating the same access request using the method of the present invention. In a request (40) for two words (word 2, word 3), the transfer takes place by first determining if the requested data words reside in the cache. If they do, then the requested words are transferred from the cache to the GDP and no cache update is necessary. If they do not, then the requested words are transferred by first writing the last two words (42) of the line to the cache only, word 4, word 1, by asserting the cache ready line (46) while deasserting the processor ready line (48). The reamining two words (44) comprising the requested words, word 2 and word 3, are then written to the GDP as well as the cache, by asserting the processor ready line (48).

The above-described method is accomplished by utilizing two pieces of information, which are placed on the bus (23) by the GDP: the data word's offset and the number of words requested. The data word's offset in the cache line is derived from address bits 2 and 3 (00=word 1, 01=word 2, 10=word 3, and 11=word 4). The number of words being requested is obtained from the size bits 0 and 1 (00=1 word, 01=2 words, 10=3 words, and 11=4 words).

Using these two pieces of information, the following algorithm is executed:

FIRST WORD ACCESSED=PROCESSOR WORD ADDRESS+SIZE+1

The 1 is added to the size in order to yield the correct offset. For example, if the GDP requests two words at offset 01 in a four-word line, it is converted to a wrap-around request of four words to memory starting at word four [offset (01)+word count (01)+1=11]. Thus, for the two-word access request of the above example, words 11 and 00 are transferred first and then words 01 and 10 are transferred as shown in table I below:

TABLE I

| | WORD ADDRESS | | ACCESS ORDER | |
|---|---|---|---|---|
| 1st word accessed | 11 | (4) | 00 | (1) |
| 2nd word requested | 10 | (3) | 11 | (4) |
| 1st word requested | 01 | (2) | 10 | (3) |
| 2nd word accessed | 00 | (1) | 01 | (2) |

The order of access for a generalized access of an m-word line, where words k through n are requested is shown in table II below:

TABLE II

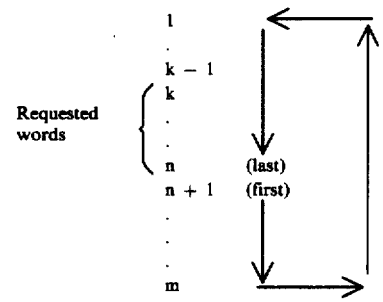

The first words (n+1 through k−1) are written to the cache only. The last words (k through n), the words actually requested by the GDP, are transferred simultaneously to the cache and GDP. For a four-word access, four wait states are saved.

The programmable logic array (PLA) algorithm for accomplishing this is listed below. The PLA (21) in the cache controller is identical to the PLA (25) in the MCU. Each PLA determines which word to start with, each PLA counts down the number of words, and each PLA counts up the word address starting with the starting address. An internal signal, load enable, loads in the processor word address and size from the bus (23). The algorithm adds one, to get the start address. Another internal signal, count enable, starts the PLA.

The PLA state machine notation used in the list below can best be explained by a short example. If the PLA is in the state noted on the left side of the page (e.g. STATE s t 1) the PLA will advance to the state indicated by the arrow (< =) (either s t 0, s t 1, s t 2, s t 3) provided the boolean logical statement set forth on the right of the arrow (< =) is satisfied. Thus the first boolean statement set forth reads as follows for "STATE s t 0;":

Go to (< =) s t 0 (that is, remain in this state 0) if the logical statement "not load enable AND not count enable OR load enable AND not cache fill AND address 00 OR load enable AND cache fill AND (address 00 AND size 11 OR address 01 AND size 10 OR address 10 AND size 01 OR address 11 AND size 00" is met.

The second boolean statement set forth reads as follows for "STATE s t 0;":

Go to (< =) s t 1 (that is, step to this state 1) if the logical statement "not load enable AND not count enable OR load enable AND not cache fill AND address 01 OR load enable AND cache fill AND address 00 AND size 00" is met.

| PLA State Listing |
|---|

INPUTS:
count enable (counten)
load enable (loaden)
cache fill (cachfill)
two address bits (ad__<2>)
two size bits (size__<2>)
OUTPUT DRIVER STATE VARIABLES:
word address (wrdad __1a)
word address (wrdad __0)
OUTPUT STATES:
s t 0 := wrdad __1a#.wrdad __0#;
s t 1 := wrdad __1a#.wrdad __0 ;
s t 2 := wrdad __1a. wrdad __0#;
s t 3 := wrdad __1a. wrdad __0 ;
STATE s t 0;
s t 0 <=   loaden#.counten# + loaden.cachfill#.ad __<00> +
           loaden.cachfill.(ad __<00>.size __<11> + ad __
           <01>.size __<10> + ad __<10>.size __<01> + ad __
           <11>.size __<00>);
s t 1 <=   counten.loaden# + loaden.cachfill#.ad __<01> +
           loaden.cachfill.ad __<00>.size __<00>;
s t 2 <=   loaden.cachfill#.ad __<10> +
           loaden.cachfill.(ad __<00>.size __<01> + ad __
           <01>.size __<00>);
s t 3 <=   loaden.cachfill#.ad __<11> +
           loaden.cachfill.(ad __<00>.size __<10> + ad __
           <01>.size __<01> + ad __<10>.size __<00>);
STATE s t 1;
s t 0 <=   loaden.cachfill#.ad __<00> +
           loaden.cachfill.(ad __<00>.size __<11> + ad __
           <01>.size __<10> + ad __<10>.size __<01> + ad __
           <11>.size __<00>);
s t 1 <=   loaden#.counten# + loaden.cachfill#.ad __<01> +
           loaden.cachfill.ad __<00>.size __<00>;
s t 2 <=   counten.loaden# + loaden.cachfill#.ad __<10> +
           loaden.cachfill#.(ad __<00>.size __<01> + ad __
           <01>.size __<00>);
s t 3 <=   loaden.cachfill#.ad __<11> +
           loaden.cachfill.(ad __<00>.size __<10> + ad __
           <01>.size __<01> + ad __<10>.size __<00>);
STATE s t 2;
s t 0 <=   loaden.cachfill#.ad __<00> +
           loaden.cachfill.(ad __<00>.size __<11> + ad __
           <01>.size __<10> + ad __<10>.size __<01> + ad __
           <11>.size __<00>);
s t 1 <=   loaden.cachfill#.ad __<01> +
           loaden.cachfill.ad __<00>.size __<00>;
s t 2 <=   loaden#.counten# + loaden.cachfill#.ad __<10> +
           loaden.cachfill.(ad __<00>.size __<01> + ad __
           <01>.size __<00>);
s t 3 <=   counten.loaden# + loaden.cachfill#.ad __<11> +
           loaden.cachfill.(ad __<00>.size __<10> + ad __
           <01>.size __<01> + ad __<10>.size __<00>);
STATE s t 3;
s t 0 <=   counten.loaden# + loaden.cachfill#.ad __<00> +
           loaden.cachfill.(ad __<00>.size __<11> + ad __
           <01>.size __<10> + ad __<10>.size __<01> + ad __
           <11>.size __<00>);
s t 1 <=   loaden.cachfill#.ad __<01> +
           loaden.cachfill.ad __<00>.size __<00>;
s t 2 <=   loaden.cachfill#.ad __<10> +
           loaden.cachfill.(ad __<00>.size __<01> + ad __
           <01>.size __<00>);
s t 3 <=   loaden#.counten# + loaden.cachfill#.ad __<11> +
           loaden.cachfill.(ad __<00>.size __<10> + ad __
           <01>.size __<01> + ad __<10>.size __<00>);
END Counter While the invention has been particularly shown and described with reference to preferred emodiments thereof, it will be understood by those skilled in the art that the foregoing and other changes in form and detail may be made therein without departing from the scope of the invention.

What is claimed is:

1. For use in a data processing system including a cache (10) backed by a main memory (12), said cache being used as an intermediate high-speed memory between said main memory and a central processing unit (14), and wherein multiple word data transfers take place between said cache and said central processing unit if data is in said cache, and between said main memory and said central processing unit if data is not in said cache, the improvement comprising:

means (15) in said central processing unit (14) for accessing said cache in a burst mode to transfer multiple words (k, k+1, ... n−1, n) included in an m-word line of data words (1, ... k−1, k+1, ... n−1, n, n+1, ... m−1, m);

cache control means (16) associated with said cache for controlling access to said cache;

memory control means (20) associated with said main memory for controlling access to said main memory;

said cache control means (16) including first means (18, 21) for indicating to said memory control means (20) that said requested data words do not reside in said cache;

a cache ready line (46), connected between said cache control means (16) and said memory control means (20), which cache ready line (46), when asserted, allows said requested data words to be transferred to said cache;

a processor ready line (48), connected between said central processing unit (14) and said memory control means (20), which processor ready line (48) when asserted allows data words to be transferred to said central processing unit (14);

said memory control means (20) including logic means (25) operative upon the condition that said first means (18, 20) indicates that said requested words do not reside in said cache for sequentially:

A. deasserting said processor ready line (48) while asserting said a cache ready line (46) to thereby cause the first words (n+1, ... m−1, m, 1, ... k−1) of the line to be transferred to said cache only, and B. asserting said processor ready line (48) while asserting said a cache ready line (46) to thereby cause the remaining words (k, k+1, ... n−1, n) to be transferred to said central processing and to be transferred to said cache.

2. In a data processing system including a cache (10) backed by a main memory (12), said cache being used as an intermediate high-speed memory between said main memory and a central processing unit (14), and wherein multiple word data transfers take place between said cache and said central processing unit (14) if requested data is in said cache, and between said main memory and said central processing unit (14) if said requested data is not in said cache, in response to a request for a plurality of words (k, k+1, ... n−1, n) included in an m-word line of data words (1, ... k−1, k, k+1 ... n−1, n, n−1, ... m−1, m), cache control means (16) associated with said cache for controlling access to said cache; memory control means (20) associated with said main memory for controlling access to said main memory;

a cache ready line (46), connected between said cache control means (16) and said memory control means (20), which cache ready line (46), when asserted, allows said requested data words to be transferred to said cache; and a processor ready line (48), connected between said central processing unit (14) and said memory control means (20), which processor ready line (48) when asserted allows data words to be transferred to said central processing unit (14);

the method comprising the steps of:

A. determining that said requested data words (k, k+1, ... n−1, n) do not reside in said cache;

B. deasserting said processor ready line (48) while asserting said a cache ready line (46) to thereby cause the first words (n+1, ... m−1, m, 1, ... k−1) of the line to be transferred to said cache only, and, C. asserting said processor ready line (48) while asserting said a cache ready line (46) to thereby cause the remaining words (k, k+1, ... n−1, n) to be transferred to said central processing and to said cache.

* * * * *

UNITED STATES PATENT AND TRADEMARK OFFICE
CERTIFICATE OF CORRECTION

PATENT NO. : 4,912,631
DATED : March 27, 1990
INVENTOR(S) : Stacey G. Lloyd

It is certified that error appears in the above-identified patent and that said Letters Patent is hereby corrected as shown below:

In column 2 at line 29 delete "thrugh" and insert --through--

In column 3 at line 42 delete "reamining" and insert --remaining--

In column 7 at line 4 insert --k,-- following "k-1,"

Signed and Sealed this

Tenth Day of September, 1996

Attest:

BRUCE LEHMAN

Attesting Officer

Commissioner of Patents and Trademarks